March 3, 1942.  M. WATTER  2,275,037
PANEL SECTION
Filed July 19, 1939
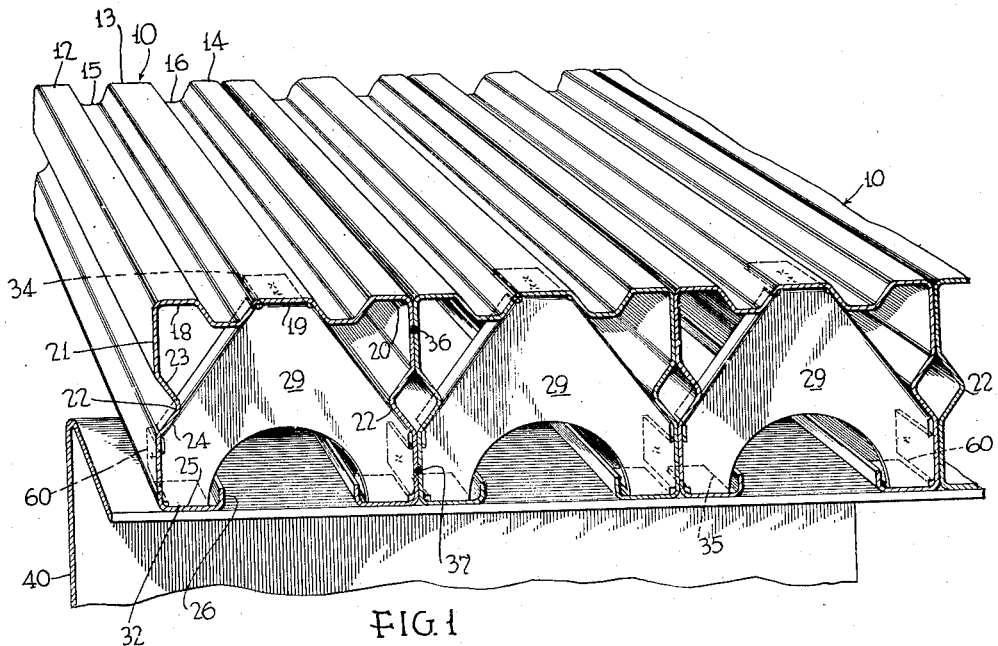
FIG.1
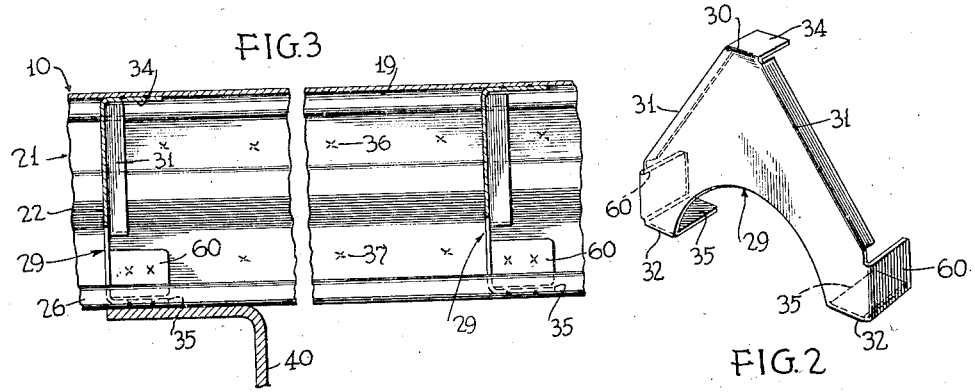
FIG.3
FIG.2
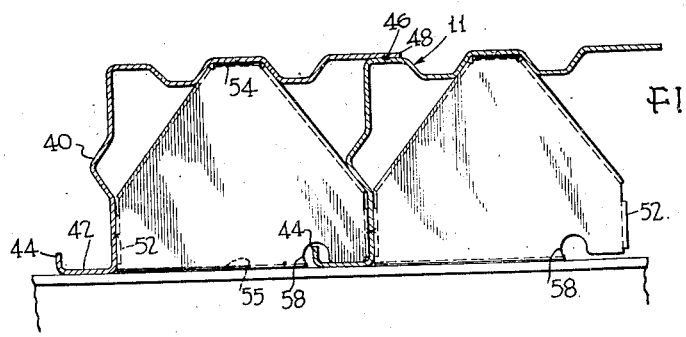
FIG.4
*INVENTOR*
Michael Watter
BY *John P. Taylor*
ATTORNEY Patented Mar. 3, 1942

2,275,037

UNITED STATES PATENT OFFICE 2,275,037

PANEL SECTION

Michael Watter, Philadelphia, Pa., assignor to Edward G. Budd Manufacturing Company, Philadelphia, Pa., a corporation of Pennsylvania Application July 19, 1939, Serial No. 285,361

4 Claims. (Cl. 189—34)

The present invention relates to panel constructions, and more particularly to a light weight panel construction or the like adapted for aircraft flooring.

The present invention aims to provide a sturdy floor construction which is suitable for aircraft and other structures where it is desired to keep the weight of the structure as low as possible.

An object of the invention is to provide a floor construction which is relatively light in weight.

Another object is to provide a floor construction formed of relatively thin sheet metal members adapted to be readily assembled and integrally secured in an economical manner.

Another object is to provide a floor construction formed of a series of channel members having a tread surface and side flanges welded to side flanges of adjacent members in an expeditious manner.

Another object is to provide a floor construction formed of a series of channel members having relatively light, but strong reinforcing members therein.

A further object is to construct an improved floor comprising parts arranged in a novel manner to provide a structure of maximum strength and minimum weight.

Other and further objects of the invention will be obvious upon an understanding of the illustrated embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein Fig. 1 is a perspective view, partly in section, illustrating an embodiment of the invention;

Fig. 2 is a perspective view of a reinforcing member utilized for strengthening the floor construction;

Fig. 3 is a transverse sectional view of a channel member, illustrating the reinforcing members secured therein; and Fig. 4 is a modified form of the invention.

Referring to the drawing in detail, there is shown, a floor construction comprising a series of channel members 10 arranged side by side and integrally secured in the manner about to be described. The channel members are formed of relatively thin, light but strong sheet metal such as stainless steel or the like. The channel members have an upper surface or tread portion provided with upwardly extending transversely spaced rib portions 12, 13 and 14 and intermediate grooves 15 and 16 which cooperate to stiffen the surface and provide a suitable tread. On the under side of the surface portion, the rib portions 12, 13 and 14 provide corresponding recesses 18, 19 and 20. The channel members also have side flanges 21, each provided with a substantially V-sectioned inwardly projecting bead or rib 22 having an upper side 23 and a lower side 24. These beads extend lengthwise at about the middle of the side flanges and serve to strengthen the channel member by preventing lengthwise bending of the side flanges. At their lower end, the side flanges are provided with inwardly extending flanges 25 having an upwardly extending flange 26 adapted to reinforce and stiffen the inwardly extending flanges 25 and the lower portion of the side flanges 21.

In order to rigidify the channel members transversely without materially increasing the weight of the floor construction, transversely extending, reinforcing members are spaced at intervals in the channel members (Fig. 3). As shown in Fig. 2, the reinforcing members may be relatively thin, metallic, substantially triangular brace plates 29 each having an upper horizontal edge portion 30 shaped to fit into the recess 19 and engage and support the underside of the surface portion. The brace plates have outwardly and downwardly sloping sides or shoulders 31 adapted to extend beneath and support the lower side 24 of the triangular bead 22, and have foot or leg portions 32 adapted to be supported by the inwardly extending flanges 25 and fit intermediate the side and upwardly extending flanges. The brace plates may be secured to the channel members by providing them with a tab or short flange 34 adjacent the upper edge portion 30 adapted to be welded at the groove 19 to the underside of the surface portion, and tabs or short flanges 35 adjacent the foot portions 32 adapted to be welded to the flanges 25 (Fig. 3), as well as side flanges 60 adapted to be welded to the lower portion of flanges 21.

The floor construction, preferably is made by first welding the brace plates in the channel members at spaced intervals and thereafter welding the side flanges of adjacent channel members together, above and below the bead as indicated at 36 and 37, although it will also appear that the channels may first be assembled and the brace plates inserted last. Such procedure would permit flexing of the floor to assist in laying the floor in close quarters. In this manner a built-up floor construction is provided which is adapted to be welded or otherwise secured to suitable supporting channels or beam members 40 (Fig. 1). In the modified form of Fig. 4, one side wall of the channel is removed, and the other supplied with an outwardly projecting bead or stiffening rib 40, and outwardly extending flange 42 with upturned stiffening flange 44. By this construction adjacent members may be roller welded as at 46, between the projection 48 and tread portion 11. The brace member may be of the shape illustrated with attaching flanges at 50, 52, and 54, as in the previous modification, and in addition may have a straight edge at 55 with a flange clearing recess 58. The various edges of this member may be stiffened along the straight edges by providing narrow flanges.

From the foregoing description it will be seen that the present invention provides an improved, simple, inexpensive floor construction which is strong and light in weight. The tread ribs and grooves reinforce the floor surface of the channel members while the bead and the inwardly and upwardly extending flanges prevent lengthwise bending of the side flanges. The brace plates further strengthen the channel member to prevent transverse bending and collapsing of the floor surface when tread upon. By supporting the legs of the brace plates on the inwardly extending flanges, and securing the tabs to the inner walls of the side flanges, the upper edge of the brace plates serve as a rigid support for the underside of the floor surface. This support is further strengthened by securing the upper edge of the brace plates to the underside of the floor portion and by supporting the inwardly projecting beads on the sides of the plates. The parts are readily assembled and can be economically spot welded to provide an integral floor structure which is rugged and can readily withstand any rough usage to which it may be subjected.

While the invention has been described, for example, in connection with floor constructions for aircraft, it will be obvious that the construction can be advantageously utilized for walls or other parts of other structures where great structural strength and minimum weight are essential.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A panel construction comprising a plurality of sheet metal channel members having their channel bottom portions disposed in a common plane and their side portions abutting and welded to corresponding side portions of adjoining channel members, each member having integral marginal flanges extending toward each other from the channel side portions substantially parallel to the channel bottom portion, and a plurality of sheet metal plates within each channel member and having a base part bridging the channel marginal flanges and seating thereon and a triangular part integral with the base part, said triangular part having a flange at the apex thereof welded to the channel bottom portion substantially midway between said side portions, said base part having flanges at the ends thereof welded to said channel side portions.

2. A panel construction comprising a plurality of flanged sheet metal members welded together in parallel relation to present a plurality of parallel channels, each channel being defined by parallel side portions and an interconnecting bottom portion, each bottom portion having spaced longitudinal portions offset into the channel, and a plurality of plates disposed in longitudinally spaced relation within said channels, each plate having a base part welded at its ends to the channel side portions and a triangular part integral with the base portion and having its apex nesting within said offset portions and welded to the channel bottom portion between said offset portions.

3. A panel construction comprising a plurality of sheet metal channel members having their bottom portions disposed in a common plane and each having its side portions in abutting engagement with and welded to corresponding side portions of adjoining channel members, each channel member having an inwardly offset longitudinally extending portion in each side portion and spaced inwardly offset longitudinally extending portions in its bottom portion, and a plurality of longitudinally spaced reinforcing plates disposed in the channel of each of said members perpendicular to the longitudinal axes thereof, each said plate having side flanges welded to said side portions, side flanges converging from said side flanges toward the bottom of the channel in engagement with the offset portions of the side and bottom portions and a flange between said converging flanges welded to the channel bottom portion.

4. A panel construction comprising a plurality of sheet metal channel members having their bottom portions disposed in a common plane, each having its side portions in abutting engagement with and welded to corresponding side portions of adjoining channel members and each having its side portions provided with marginal flanges facing inwardly toward each other substantially parallel to its bottom portion, and a plurality of reinforcing plates spaced longitudinally within the channel of each of said members, each of said plates seating upon said marginal flanges in bridging relation and being welded to said side portions, each of said plates also being triangular in shape and having the apex thereof welded to the channel bottom portion substantially midway between the channel side portions.

MICHAEL WATTER.